(12) United States Patent
Schneider

(10) Patent No.: US 6,570,871 B1
(45) Date of Patent: *May 27, 2003

(54) INTERNET TELEPHONE SERVICE USING CELLULAR DIGITAL VOCODER

(75) Inventor: Allan Schneider, Falls Church, VA (US)

(73) Assignee: Verizon Services Corp., Arlington, VA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 973 days.

(21) Appl. No.: 08/727,730

(22) Filed: Oct. 8, 1996

(51) Int. Cl.[7] .......................... H04L 12/66; H04L 12/56
(52) U.S. Cl. ........................................ 370/356; 370/401
(58) Field of Search .......................... 375/200; 370/328, 370/335, 338, 337, 401, 389, 342, 352, 356; 455/433, 445, 560

(56) References Cited

U.S. PATENT DOCUMENTS

| | | | |
|---|---|---|---|
| 4,659,877 A | 4/1987 | Dorsey et al. | 379/88 |
| 4,872,160 A | 10/1989 | Hemmady et al. | 370/353 |
| 4,872,197 A | 10/1989 | Pemmaraju | 379/93 |
| 4,893,335 A | 1/1990 | Fuller et al. | 379/200 |
| 4,901,342 A | 2/1990 | Jones | 379/93 |
| 4,916,691 A * | 4/1990 | Goodman | 370/389 |
| 4,958,341 A | 9/1990 | Hemmady et al. | 370/352 |
| 4,972,479 A | 11/1990 | Tobias, Jr. et al. | 379/58 |
| 5,159,592 A | 10/1992 | Perkins | 370/338 |
| 5,181,200 A | 1/1993 | Harrison | 370/468 |
| 5,195,090 A | 3/1993 | Bolliger et al. | 370/314 |
| 5,305,308 A | 4/1994 | English et al. | 370/335 |

(List continued on next page.)

OTHER PUBLICATIONS

Newton, Harry, "Newton's Telecom Directory", 11th Ed., Flatiron Publishing, Inc. (Jul. 1996), p. 120 and supplement insert.

Transcript of audio tape of Internet Talk Radio interviews re Mobile IP Networking: "Geek of the Week", Carl Malamud Interviews with Phil Karn, Nov. 1993, and Jun Murai, Jul. 1993.

Mills, Mike, "Freebie Heebie–Jeebies", The Washington Post, Mar. 8, 1996.

Hughes, David T., "What hath (net) god wrought?", The [Fairfax, VA] JOURNAL, Feb. 21, 1995.

(List continued on next page.)

*Primary Examiner*—Steven Nguyen
*Assistant Examiner*—Phuongchau Ba Nguyen
(74) *Attorney, Agent, or Firm*—Leonard Suchyta; Loren Swingle; Radner, Fishman & Grauer PLLC

(57) ABSTRACT

A system and method for providing telephone type services over the internetwork commonly known as the Internet. Wireless digital telephones in communication with wireless digital communications systems have speech coders that generate digital voice samples, and encoders that encode the digital voice samples to minimize bit errors during RF transmission. The wireless digital communications system demodulates the received modulated wireless signal transmitted by the digital telephone to recover the encoded, digital voice samples. The error correction codes within the encoded, digital voice samples are removed to recover the original digital voice samples generated by the vocoder in the digital telephone. The decoded digital voice samples are then supplied to a gateway interface that packetizes the decoded digital voice samples into digital voice sample segments, assigns a packet address corresponding to the destination telephone number, and outputs the digital voice sample segments as data packets onto a packet switched network, such as the Internet, for reception by a network node corresponding to the destination address.

31 Claims, 11 Drawing Sheets

U.S. PATENT DOCUMENTS

| | | |
|---|---|---|
| 5,327,486 A | 7/1994 | Wolff et al. .................... 379/96 |
| 5,339,316 A | 8/1994 | Diepstraten ................. 370/401 |
| 5,341,374 A | 8/1994 | Lewen et al. ............... 370/450 |
| 5,355,365 A | 10/1994 | Bhat et al. .................. 370/401 |
| 5,363,369 A | 11/1994 | Hemmady et al. .......... 370/392 |
| 5,375,068 A | 12/1994 | Palmer et al. .......... 364/514 C |
| 5,410,543 A | 4/1995 | Seitz et al. |
| 5,410,754 A | 4/1995 | Klotzbach et al. |
| 5,434,853 A | 7/1995 | Hemmady et al. |
| 5,434,854 A | 7/1995 | Focarile et al. |
| 5,434,913 A | 7/1995 | Tung et al. |
| 5,438,565 A | 8/1995 | Hemmady et al. |
| 5,442,633 A | 8/1995 | Perkins et al. |
| 5,454,030 A | 9/1995 | de Oliveria et al. ........ 379/100 |
| 5,457,680 A | 10/1995 | Kamm et al. |
| 5,475,689 A | 12/1995 | Kay et al. |
| 5,481,535 A | 1/1996 | Hershey |
| 5,481,544 A | 1/1996 | Baldwin et al. |
| 5,483,524 A | 1/1996 | Lev et al. |
| 5,487,065 A | 1/1996 | Acampora et al. |
| 5,490,139 A | 2/1996 | Baker et al. |
| 5,490,247 A | 2/1996 | Tung et al. |
| 5,493,568 A | 2/1996 | Sampat et al. |
| 5,499,372 A | 3/1996 | MacKenzie et al. ........ 395/728 |
| 5,502,721 A | 3/1996 | Pohjakallio |
| 5,502,725 A | 3/1996 | Pohjakallio |
| 5,509,000 A | 4/1996 | Oberlander ................. 370/409 |
| 5,590,133 A * | 12/1996 | Billström et al. ........... 370/338 |
| 5,608,786 A | 3/1997 | Gordon |
| 5,724,355 A | 3/1998 | Bruno et al. |
| 5,726,984 A | 3/1998 | Kubler et al. |
| 5,793,762 A | 8/1998 | Penners et al. ............. 370/389 |
| 5,793,980 A * | 8/1998 | Glaser et al. ............... 370/528 |
| 5,835,495 A * | 11/1998 | Ferriere ..................... 370/465 |
| 5,850,433 A * | 12/1998 | Rondeau ..................... 379/201 |
| 5,910,946 A * | 6/1999 | Csapo ........................ 370/352 |
| 5,953,505 A * | 9/1999 | Chida ......................... 370/475 |

OTHER PUBLICATIONS

Mills, Mike, "It's the Net's Best Thing to Being There", The Washington Post, Jan. 23, 1996.

Hughes, David T., Internet phone wars heating up, The [Fairfax, VA] JOURNAL, Jan. 2, 1996.

Kuehn, Richard A., "The Voice of Technology", Credit World, vol. 82, No. 6, pp. 20–23 (Jul. 1994).

Hughes, David T., "WebPhone heading for serious telephony", The [Fairfax, VA] JOURNAL, May 28, 1996.

Yang, "INET Phone: Telephone Services and Server on Internet." University of North Texas, p 1–6, Apr. 1995.*

Margulies, Edwin. (1996). Virtual PBX Network Gateway and Voice–Enabled Internet Standards. In *Understanding the Voice–Enabled Internet*, pp. 4–42, 12–1–12–3.

* cited by examiner

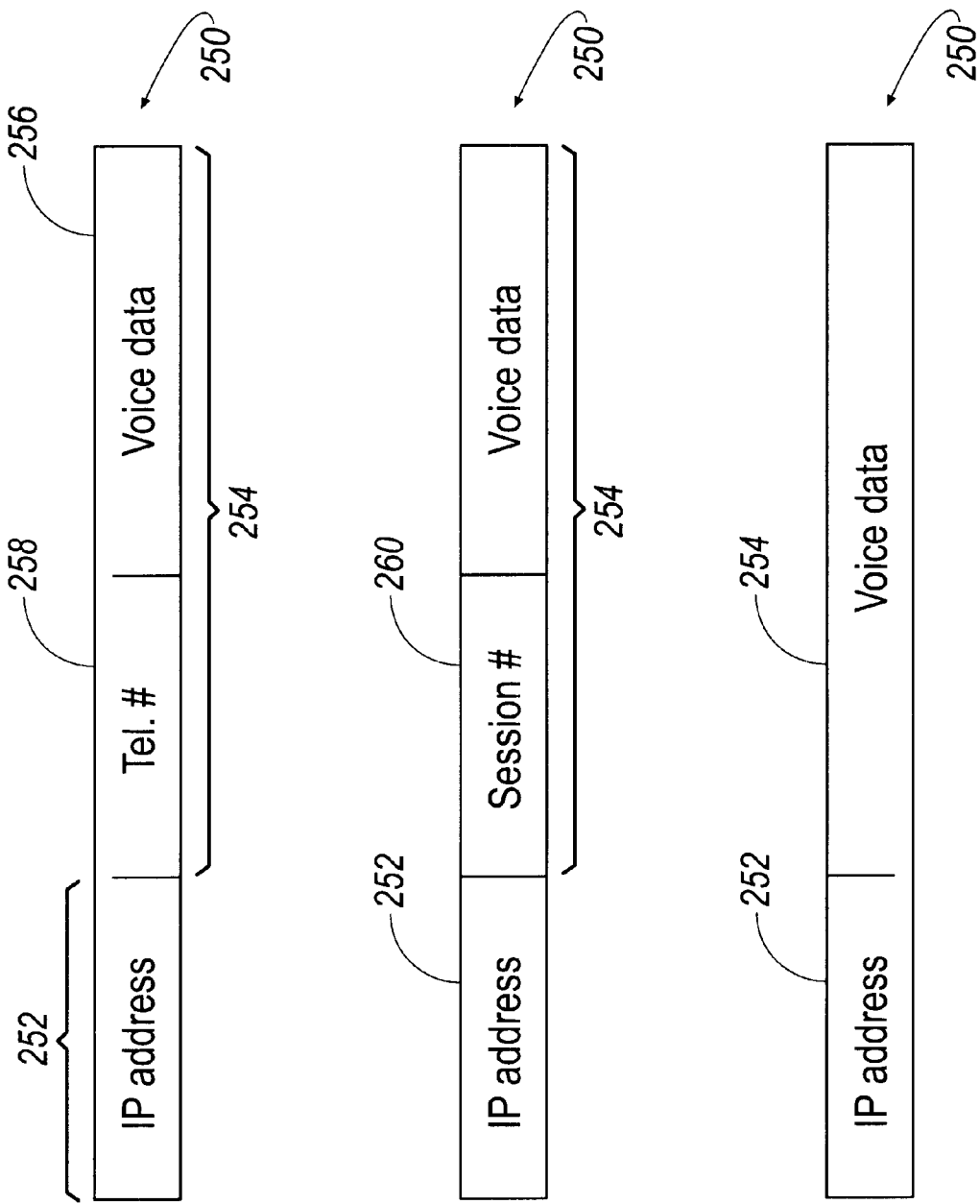

INTERNET TELEPHONE SERVICE USING CELLULAR DIGITAL VOCODER

TECHNICAL FIELD

The present invention relates to methods and system structures for providing public and private telephone service over the Internet and more particularly relates to providing such services through the public telecommunications system including over existing copper telephone lines.

DESCRIPTION OF THE RELATED ART

Attention recently has been directed to implementing voice telephone service over the worldwide network now commonly known as the Internet. The Internet had its genesis in U.S. Government (called ARPA) funded research which made possible national internetworked communication systems. This work resulted in the development of network standards as well as a set of conventions for interconnecting networks and routing information. These protocols are commonly referred to as Transmission Control Protocol/Internet Protocol (TCP/IP). The protocols generally referred to as TCP/IP were originally developed for use only through Arpanet and have subsequently become widely used in the industry. TCP/IP is flexible and robust; in effect, TCP takes care of the integrity and IP moves the data. Internet provides two broad types of services: connectionless packet delivery service and reliable stream transport service. The Internet basically comprises several large computer networks joined together over high-speed data links ranging from ISDN to T1, T3, FDDI, SONET, SMDS, OC1, etc. The most prominent of these national nets are MILNET (Military Network), NSFNET (National Science Foundation NETwork), and CREN (Corporation for Research and Educational Networking). In 1995, the Government Accounting Office (GAO) reported that the Internet linked 59,000 networks, 2.2 million computers and 15 million users in 92 countries. It is presently estimated that the growth of the Internet is at a more or less annual doubling rate.

Referring to FIG. 1 there is shown a simplified diagram of the Internet. Generally speaking the Internet consists of Autonomous Systems (AS) which may be owned and operated by Internet Service Providers (ISPs) such as PSI, UUNET, MCI, SPRINT, etc. Three such AS/ISPs are shown in FIG. 1 at 10, 12 and 14. The Autonomous Systems (ASs) are linked by Inter-AS Connections 11, 13 and 15. Information Providers (IPs) 16 and 18, such as America Online (AOL) and Compuserve, are connected to the Internet via high speed lines 20 and 22, such as T1/T3 and the like. Information Providers generally do not have their own Internet based Autonomous Systems but have or use Dial-Up Networks such as SprintNet (X.25), DATAPAC and TYMNET.

By way of current illustration MCI is both an ISP and an IP, Sprint is an ISP, and MicroSoft (MSN) is an IP using UUNET as an ISP. Other information providers, such as universities, are indicated in exemplary fashion at 24 and are connected to the AS/ISPs via the same type connections here illustrated as T1 lines 26. Corporate Local Area Networks (LANs), such as those illustrated in 28 and 30, are connected through routers 32 and 34 and links shown as T1 lines 36 and 38. Laptop computers 40 and 42 are representative of computers connected to the Internet via the public switched telephone network (PSTN) are shown connected to the AS/ISPs via dial up links 44 and 46.

The Information Providers (IPs) constitute the end systems which collect and market the information through their own servers. Access providers are companies such as UUNET, PSI, MCI and SPRINT which transport the information. Such companies market the usage of their networks.

In simplified fashion the Internet may be viewed as a series of routers connected together with computers connected to the routers. In the addressing scheme of the Internet an address comprises four numbers separated by dots. An example would be 164.109.211.237. Each machine on the Internet has a unique address which constitutes one of these four numbers. In the address the leftmost number is the highest number in the Internet hierarchy. By analogy this would correspond to the ZIP code in a mailing address. At times the first two numbers constitute this portion of the address indicating a network or a locale. That network is connected to the last router in the transport path. In differentiating between two computers in the same destination network only the last number field changes. In this example the next number field 211 identifies the destination router. When the packet bearing the destination address leaves the source router the first two numbers are matched in a matrix table to determine how many hops are the minimum to get to the destination. It then sends the packet to the next router as determined from that table and the procedure is repeated. Each router has a database table that finds the information automatically. This continues until the packet arrives at the destination computer. Depending on traffic load, the separate packets that constitute a message may not travel the same path. However they all reach the same destination and are assembled by TCP in their original order. This is in contrast to connection oriented modes such as frame relay and ATM or voice.

One or more companies have recently developed software for use on personal computers to permit two-way transfer of real-time voice information via an Internet data link between two personal computers. In one of the directions, the sending computer converts voice signals from analog to digital format. The software facilitates data compression down to a rate compatible with modem communication via a POTS telephone line. The software also facilitates encapsulation of the digitized and compressed voice data into the TCP/IP protocol, with appropriate addressing to permit communication via the Internet. At the receiving end, the computer and software reverse the process to recover the analog voice information for presentation to the other party. Such programs permit telephone-like communication between Internet users registered with Internet Phone Servers.

The book "Mastering the Internet", Glee Cady and Pat McGregor, SYBEX Inc., Alameda, Calif., 1994, ISBN 94-69309, very briefly describes three proprietary programs said to provide real-time video and voice communications via the Internet.

Palmer et al. U.S. Pat. No. 5,375,068, issued Dec. 20, 1994 for Video Teleconferencing for Networked Workstations discloses a video teleconferencing system for networked workstations. A master process executing on a local processor formats and transmits digital packetized voice and video data, over a digital network using TCP/IP protocol, to remote terminals.

Lewen et al. U.S. Pat. No. 5,341,374, issued Aug. 23, 1994 for Communication Network Integrating Voice Data and Video with Distributed Call Processing, discloses a local area network with distributed call processing for voice, data and video. Real-time voice packets are transmitted over the network, for example to and from a PBX or central office.

Hemmady et al. U.S. Pat. No. 4,958,341, issued Sep. 18, 1990 for Integrated Packetized Voice and Data Switching System, discloses an integrated packetized voice and data switching system for a metropolitan area network (MAN). Voice signals are converted into packets and transmitted on the network. Tung et al. U.S. Pat. No. 5,434,913, issued Jul. 18, 1995, and U.S. Pat. No. 5,490,247, issued Feb. 6, 1996, for Video Subsystem for Computer Based Conferencing System, disclose an audio subsystem for computer-based conferencing. The system involves local audio compression and transmission of information over an ISDN network.

Hemmady et al. U.S. Pat. No. 4,872,160, issued Oct. 3, 1989, for Integrated Packetized Voice and Data Switching System, discloses an integrated packetized voice and data switching system for metropolitan area networks.

Sampat et al. U.S. Pat. No. 5,493,568, issued Feb. 20, 1996, for Media Dependent Module Interface for Computer Based Conferencing System, discloses a media dependent module interface for computer based conferencing system. An interface connects the upper-level data link manager with the communications driver.

Koltzbach et al. U.S. Pat. No. 5,410,754, issued Apr. 25, 1995, for Bi-Directional Wire Line to Local Area Network Interface and Method, discloses a bi-directional wire-line to local area network interface. The system incorporates means for packet switching and for using the internet protocol (IP).

Wireless digital communications communications systems such as cellular and PCS telephone networks provide wireless telephone service by providing base stations that communicate over a common air interface with subscribers within a reception range, commonly referred to as cells. As users cross coverage areas of a given base station, a handoff of the telephone call occurs between an active base station and an adjacent base station accepting the call. The base stations are controlled by a base station controller (BSC), that switches the calls between the base stations. The BSC's are ultimately controlled by a mobile switching center (MSC), which routes calls between the wireless digital communications sytem and the public switched network.

If a call is placed by a wireless telephone user to a destination that is outside the wireless digital communications system, the MSC will route the call to the destination via the public switched network using either a local exchange carrier, an interexchange carrier, or both. Hence, the wireless telephone user may incur landline charges for access of the public switched telephone network.

DISCLOSURE OF THE INVENTION

There is a need to provide a wireless digital communication telephone network that can complete calls initiated by wireless subscribers without requiring access to the public switched telephone network.

There is also a need to provide a wireless digital communication network that can receive telephone calls intended for subscribers and that are received from a source other than the public switched telephone network.

There is a need to provide telephone service via the Internet to users of the public telecommunications network without requiring the use of a computer.

There is also a need to provide an economical and convenient telephone service via the Internet without requiring familiarity with the Internet or its methodology on the part of the user.

There is also a need to provide the public with impulse access to the Internet for voice communications without requiring maintenance of a subscription to an Internet access service.

There is also a need to provide the foregoing types of telephone service over the Internet via the public telephone network without the necessity of reliance on signaling systems of interexchange carriers.

There also exists a need to provide voice service over public telephone systems via the Internet where the use of the Internet is optional to the Telco and transparent to the customer.

These and other needs are attained by the present invention, where encoded digital voice samples received from a digital communications device having a vocoder are decoded in a wireless digital communications system, and the decoded digital voice samples are packetized into data packets for transmission onto a wide area packet switched network. The data packets are received at a destination node on the packet switched network, and the digital voice samples are recovered from the data packets for transmission to a station corresponding to a destination telephone number.

According to one aspect of the present invention, a wireless digital communications system receiving a modulated wireless signal from a digital telephone having a subscriber telephone number includes a system for establishing voice communications between the digital telephone and a destination telephone number using a packet switched network such as the Internet. The modulated wireless signal received by the wireless digital communications system carries encoded, digital voice samples for the destination telephone number. The system of the present invention comprises a wireless transceiver having a demodulator demodulating the received modulated wireless signal and outputting a first data stream carrying the encoded, digital voice samples. A decoder outputs the digital voice samples from the first data stream, and a gateway interface sends and receives packet data from a packet switched network. The gateway interface includes a packet assembler/disassembler that packetizes the digital voice samples into data packets having a destination address corresponding to the destination telephone number, and the gateway interface outputs the data packets onto the packet switched network for reception by a network node corresponding to said destination address.

The present invention enables a wireless digital communications system, for example a digital cellular or PCS system, to bypass local exchange carriers and interexchange carriers by sending and receiving data packets carrying digital voice samples via the packet switched network to a destination network node serving the destination telephone number. If desired, the system of the present invention may also include a transcoder transcoding the encoded digital voice samples for transmission via the public switched telephone network. Hence, the present invention enables a wireless digital communications system to selectively route wireless traffic via the public switched telephone network or the packet switched network.

In another aspect of the present invention, a wireless digital communications system uses a system to send data packets carrying decoded digital voice samples onto a packet switched network. The wireless digital communications system has at least one wireless transceiver that receives a modulated wireless signal from a digital telephone. The modulated wireless signal carries encoded digital voice samples for a destination telephone number. The system of the present invention includes a first interface that receives from the wireless digital communications system a data stream carrying the encoded digital voice samples. The first interface decodes the encoded digital voice samples and packetizes the decoded digital voice samples from the data stream into data packets. The system of the present invention also includes a router assigning a packet address to the data packets in response to the destination telephone number, and a second interface outputting the assigned data packets onto a packet switched network for reception by a network node corresponding to said destination address. Hence, the present invention provides an arrangement enabling a wireless digital communications system outputting encoded digital voice samples from a digital telephone to interface with the packet switched network for two-way voice communications.

Still another aspect of the present invention provides a method for use in a wireless digital communications system. The wireless digital communications system has at least one wireless transceiver receiving a modulated wireless signal from a digital telephone. The received modulated wireless signal carries encoded digital voice samples for a destination telephone number, and the wireless digital communications system in response sends a data stream carrying the encoded digital voice samples. The method of the present invention comprises the steps of decoding the encoded digital voice samples, and packetizing the decoded digital voice samples into data packets. A packet address corresponding to the destination telephone number is assigned to the data packets, and the assigned data packets are sent from a network interface having a network address onto a packet switched network for reception by a network node corresponding to the destination address.

The present invention thus provides an arrangement for providing telephone type services over a packet switched network, such as the Internet, by transporting digital voice samples generated by vocoders in wireless digital communications networks. The present invention also provides an arrangement enabling public switched telephone networks utilizing program controlled switching systems to provide telephone type services over packet switched networks, such as the Internet, for facilitating telephone use of the Internet by digital wireless telephone users on an impromptu basis. A caller is thus able to set-up and carry out a telephone call over the Internet from telephone station to telephone station without access to computer equipment, without the necessity of maintaining a subscription to any Internet service, and without the requiring Internet literacy or knowledge. Calls may be made on an inter or intra LATA, region or state, nationwide or worldwide basis. Billing may be implemented on a per call, timed, time and distance or other basis. Usage may be made of common channel interoffice signaling to set up the call and establish the necessary Internet connections and addressing. Calls may be made from wireless telephone station to wireless telephone station, from wireless telephone station to landline telephone station, or from landline telephone station to wireless station. Calls may also be made from wireless telephone station to computer, or computer to wireless telephone station.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DESCRIPTION OF THE DRAWINGS

Reference is made to the attached drawings, wherein elements having the same reference numeral designations represent like elements throughout and wherein:

FIGS. 9A, 9B and 9C are alternate implementations of a data packet transporting digital voice samples on a packet switched network.

BEST MODE OF CARRYING OUT THE INVENTION

Figure 2:
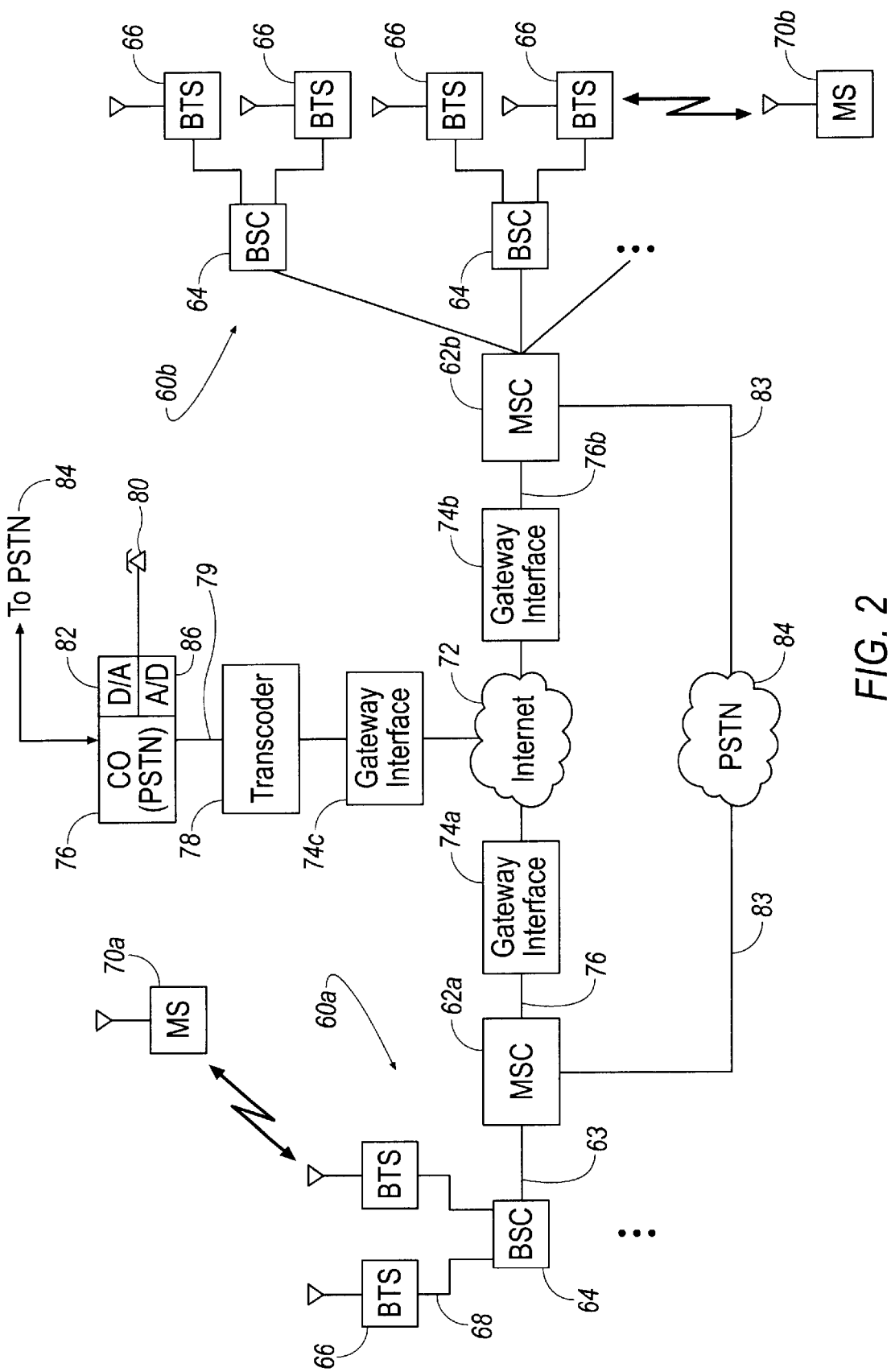
FIG. 2 is a block diagram illustrating a system for transporting digital voice samples via a packet switched network according to an embodiment of the present invention.

FIG. 2 is a block diagram illustrating a system for transporting digital voice samples received by a wireless digital communication system to a destination facility via a public, packet switched data network, such as the Internet (or vice versa). FIG. 2 discloses wireless digital communications networks 60a and 60b, each including mobile switching centers (MSC) 62, base station controllers (BSC) 64, and base stations (BTS) 66. The base stations 66 are connected to the base station controllers 64 by digital transmission links 68, such as T1 transmission lines. Each of the digital wireless communications systems 60 may be implemented either as a TDMA (time-division multiple access) system or a CDMA (code division multiple access) system. TDMA systems may be implemented using either the Pan-European digital mobile radio system GSM, DSC1800, PCN (personal communication network), or the North American TDMA digital cellular system known as IS-54. Similarly, the CDMA system may be implemented using the known IS-95 standard.

As recognized in the art, both TDMA and CDMA wireless communication systems are designed to overcome the severe effects encountered during transmission across the air interface that cause bit errors in digital data. For example, a digitized voice is processed with a plurality of error correction schemes to ensure that the voice quality is not degraded during propagation across the air interface due to factors such as multi-path interference, fading, etc.

As described below, a digital wireless telephone, also referred to as a mobile station (MS), includes a speech coder, also referred to as a vocoder, that digitizes a speaker's voice into digital voice samples having a data rate of, for example, 9.6 kilobits per second (kbps). The digital voice samples are then processed by error correction techniques such as encoding, interleaving, etc., to assure that the information in the digital voice samples are reliably transmitted over the common air interface between the digital telephone 70 and the base station 66. After performing the error correction techniques on the digital voice samples to make the digital voice samples resistant to errors, the resulting stream of digital data, referred to as the encoded, digital voice samples, are modulated and transmitted by the digital telephone 70 as a modulated wireless signal carrying the encoded, digital voice samples.

According to the disclosed embodiment, the wireless digital communications system 60 demodulates the received modulated wireless signal transmitted by the digital telephone 70 to recover the encoded, digital voice samples. The error correction codes within the encoded, digital voice samples are removed, i.e., the error correction codes are stripped off, by decoding the encoded digital voice samples to recover the original digital voice samples as generated by the vocoder in the digital telephone. The decoded digital voice samples are then supplied to a gateway interface that packetizes the decoded digital voice samples into digital voice sample segments. Each sample segment is transported as payload data of a data packet having a recognized format, for example, TCP/IP. The data packets carrying the digital voice sample segments are assigned a packet address corresponding to the destination telephone number. The assigned data packets are sent by the gateway interface onto the packet switched network, for example, the Internet, for reception by a network node corresponding to the destination address in the data packets.

As shown in FIG. 2 each of the MSC's 62 are connected to a packet switched network 72, such as the Internet, via a gateway interface 74. The gateway interface 74 receives digital voice samples from the MSC 62. According to one embodiment, BTS's 66 or the MSC 62 performs the decoding to recover the original digital voice samples, and the gateway interface 74 receives the digital voice samples in an encoded format corresponding to the transcoding parameters used during transport between communication lines 76. Hence, the gateway interface 74 essentially receives the decoded digital voice samples from the MSC 62.

According to an alternate embodiment, the MSC 62 passes the encoded, digital voice samples to the gateway interface 74 after demodulation of the received wireless signal. Hence, the digital voice samples forwarded by the MSC 62*a* include the error correction codes generated by the digital telephone 70 during transmission of the digital voice samples. In this embodiment, the gateway interface 74 includes the necessary error correction/decoding systems to recover the digital voice samples from the encoded, digital voice samples forwarded by the MSC. As described below, the gateway interface 74 strips off all the error correction codes and encoding parameters to recover the original digital voice samples generated by the vocoder in the digital telephone 70. The digital voice samples are then packetized into data packets and output onto the packet switched network 72 for transmission to a destination node.

As shown in FIG. 2, the destination node may be another gateway interface having a network address corresponding to the IP address of the transmitted data packets. Since the network node is implemented as a gateway interface 74, the data packets may be routed to any communications system serving the destination telephone number having a gateway interface. For example, a central office 76 may have access to the packet switched network 72 via a gateway interface 74*c*. The gateway interface 74*c* receives data packets having a destination address corresponding to the network address of the gateway interface 74*c*. The gateway interface recovers the payload of the received data packets, namely the digital voice sample segments, and assembles the payload data into the transmitted digital voice samples. The assembled digital voice samples are then output from the gateway interface 74*c* to a transcoder 78 which provides the appropriate protocol for transmitting the digital voice samples on high speed tandem trunk lines 79, for example, T1 or T3 lines, for reception by the central office 76. If the destination telephone number corresponds to an analog telephone 80, the central office 76 supplies the digital voice samples to a digital to analog converter 82 that outputs analog voice signals in accordance with the vocoder protocal or algorithm used by the digital telephone 70.

Hence, use of the gateway interfaces 74 to access the Internet 72 enables the wireless digital communication systems 60 to bypass a public switched telephone network 84, thereby providing an alternate transport path for voice traffic. Hence, local exchange carriers and inter-exchange carriers may be bypassed as desired.

The gateway interfaces 74 also provide an advantageous arrangement that enables the central office to access the Internet 72, even though the central office 76 is actually part of the public switched telephone network. The central office 76 may thus access the Internet as part of a two-way voice connection between a digital telephone calling the destination station 80 via the Internet. Alternately, the central office may access the Internet as an alternate route for voice traffic, for example if trunk lines with the PSTN 84 or disabled. Alternately, the central office 76 may access the Internet to provide intra-LATA or long distance services without leasing access from interexchange carriers.

Hence, if the user of the telephone 80 has subscribed to an Internet access service where telephone calls are routed via the Internet 72, the central office will include a vocoder 86 that digitizes the analog speech signals output by the telephone 80. The analog to digital converter 86 may be of similar design to the vocoders in the digital wireless telephone 70, or may follow a different algorithm, as desired. The digital voice samples from the analog to digital converter 86 are output from the central office to tandem trunk lines 79 for transmission to the gateway interface 74*c*. The transcoder 78 receives the digital voice samples from the trunk line 79 and passes the digital voice samples to the gateway interface 74*c*, which packetizes and outputs the digital voice samples as data packets having a destination address corresponding to the destination telephone number.

Figure 3:
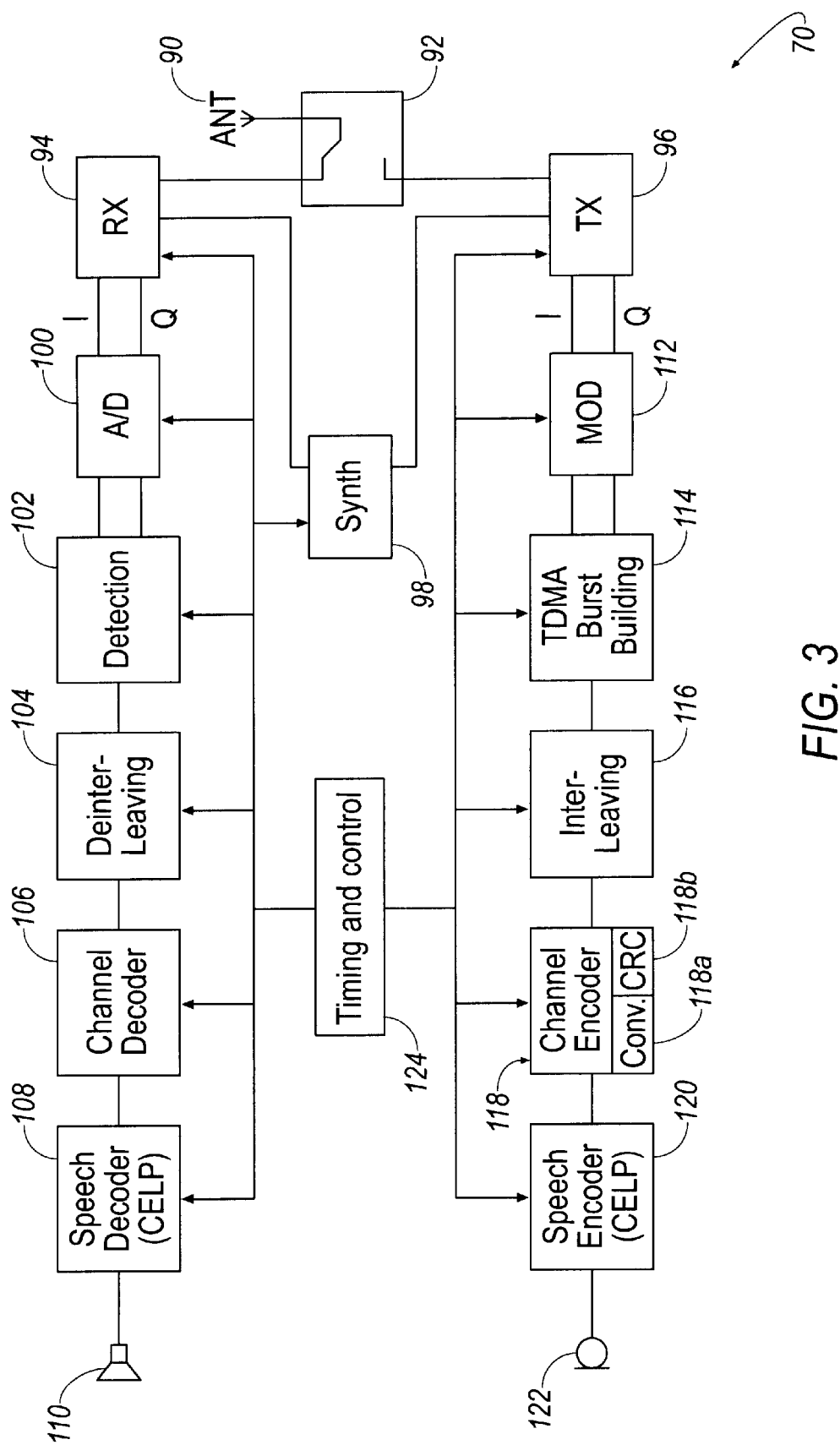
FIG. 3 is a block diagram of a digital telephone operating according to time-division multiple access (TDMA) modulation techniques.

FIG. 3 is a block diagram of a digital wireless telephone operating according to time division multiple access (TDMA) modulation techniques. The digital phone 70 of FIG. 3 may be implemented according to the GSM or North American TDMA (IS-54) standards, to generate digital voice samples from human speech, and encode the digital voice samples to generate encoded, digital voice samples for transmission via the common air interface. As shown in FIG. 3, the wireless digital telephone 70 comprises an antenna 90, a duplex filter 92, a receiver 94, a transmitter 96, and a synthesizer 98. The digital telephone 70, also referred to as a mobile station (MS), inclues a receiver portion receiving and processing TDMA signals from the BTS 66. The receiver portion includes the receiver 94 receiving the TDMA burst at selected channel frequencies, an analog to digital (A/D) converter 100, a detector 102, a deinterleaver 104 performing deinterleaving functions, a channel decoder 106, a speech coder 108 and a loudspeaker 110 connected in series with the receiver 94.

The transmitting portion of the MS 70 transmitting a modulated wireless signal carrying encoded, digital voice samples to the BTS 66 includes a modulator 112, a TDMA burst building portion 114, an interleaver 116 performing interleaving functions, a channel coder 118, a speech coder 120, and a microphone 122. Operation of the MS 70 is controlled generally by the timing and control unit 124.

Transmission of digital voice samples begins by a user of the digital telephone 70 speaking into the microphone 122. The microphone 122 generates analog voice signals having a frequency range of approximately 4 kHz in response to detection of the acoustic energy of the user's speech. The analog voice signals are supplied to the speech coder 120, which digitizes the analog speech signal into digital voice samples. The speech coder 120 may be implemented using a variety of speech coding protocols or algorithms. For example, the 4 kHz analog speech signal output from the microphone 122 may be converted into a 13 kilobit per second (kbps) digital voice sample sequence using Regular Pulse Excitation (RPE), and/or Linear Predictive Coding (LPC). RPE generates the impulse noise to simulate the nature of speech, whereas LPC uses a filter with 8 transmitted coefficients to generate a 260-bit speech frame representing speech having a duration of 20 milliseconds. LPC thus uses 260 bits to represent a 20 millisecond speech frame. The RPE and LPC techniques are generally used in GSM digital systems.

The GSM system also supports two modes of voice transmission, namely continuous (normal mode) and discontinuous (DTX). The discontinuous transmission (DTX) mode decreases the effective radio transmission encoding of speech at 13 kbps to a bit rate of around 500 bps without speech. Hence, active speech generates a frame of 260 bits each 20 milliseconds, and a frame of 260 bits in 480 milliseconds for inactive speech. Hence, the frame rate is 24 times longer for inactive speech than in normal mode. A voice activity device within the speech coder (not shown) detects the DTX mode. Detection of the DTX mode at the receiving end (i.e., the BTX 66) is detected by the presence of a silence detection (SID) frame proceeding the start of DTX. The speech coder provides an additional bit of information whether the speech frame needs to be sent, depending on the voice activity device algorithm. A SID frame will start at every inactivity period and repeat at least twice per second, as long as inactivity lasts. During the inactive speech period, artificial noise is generated at the receiver, substituting for background noise.

An alternative speech coding technique for use in North American TDMA systems (IS-54) involves a class of speech coding known as code excited linear predictive (CELP) coding. The preferred coding technique, known as vector-sum excited linear predictive coding (VSELP), uses a codebook to vector-quantize the excitation (residual) signal such that the computation required for the codebook search process at the sender can be significantly reduced. The speech coder sampling rate is 7950 bits per second. The analog speech signal from the microphone 122 is broken into frames, where each frame is 20 milliseconds long and contains 160 symbols. Each frame is further divided into subframes that are 40 samples long, each having a duration of 5 milliseconds. Hence, the speech coder 118 output a 159 bit frame at 28 milliseconds.

Hence, the speech coder 120 outputs digital voice samples at a rate of 13 kbps for GSM systems (i.e., 260 bits in 20 milliseconds speech block), or 7950 bps for North American TDMA systems (i.e., 159 bit frames at 20 milliseconds). The digital voice samples are supplied to a channel coder 118, which performs coding on the digital voice samples to improve transmission quality when interference, multipath fading, and Doppler shift are encountered over the air interface. As a result, the bit error rate and frame error rate are reduced, although the throughput over the common air interface is also reduced. The channel coder 118 includes a convolutional encoder 118a and a decoder 118b that performs cyclic redundancy check (CRC). The convolutional encoder 118a is used to correct random errors. According to GSM protocol, four types of channel codings are used, namely, convolutional codes, fire codes, parity check codes, and concatenation codes. If the North American TDMA (IS-54) standard is used, the channel coder 118 will output typically 260 bits total for a 20 millisecond speech frame. Hence, the channel coder 118 adds an additional 101 bits of error correction codes for each 20 millisecond frame.

The frames having the error correction codes from the coder 118 are supplied to an interleaving device 116, which scrambles, i.e., distributes, the sequence of bits prior to transmitting the digital data. The term encoded, digital voice samples refers to the digital voice samples that have at least some error correction codes inserted to reduce the bit error during transmission over the common air interface. Additional error correction such as interleaving provide more robust encoded digital voice samples having an even lower bit error rate during wireless transmission.

Interleaving is used to minimize bursts of errors that may occur during transmission due to signal fading. According to the North American TDMA standard (IS-54), the encoded speech output from the channel coder 118 is interleaved over two time slots, such that each time slot contains two frames. The interleaved signal is then output to a TDMA burst building block 114, which builds the TDMA frame by adding 6 tail bits, 26 training bits, two flag bits, and a guard time equal 8.25 bits (GSM format). The North American TDMA (IS-54) frame also includes similar overhead generated in the TDMA burst building portion 114, for example an application message header, mandatory fixed parameters, mandatory variable parameters, remaining length, and optional variable parameters. Hence, the encoded digital voice samples are output as TDMA frames having encoding and interleaving.

The TMDA frame is output from the TDMA burst building portion 114 to a modulator 112, which perform QPSK modulation or a similar form of modulation. The I and Q modulated signals are output to a transmitter 96, which outputs the modulated wireless signal carrying the encoded, digital samples to the antenna 90 under the control of the duplex filter 92.

Complementary telephone processing functions are performed by the receiving end of the digital telephone 70. The receiver 94 receives via antenna 90 a modulated wireless signal from a base station 66, and outputs the I and Q modulated signals to a demodulator 100, which performs the necessary analog to digital conversion to recover the TDMA frames carrying the encoded digital voice samples. The detector 102 processes the TDMA frame, and passes the encoded digital voice samples to the deinterleaving device 104.

The deinterleaver 104 receives the time slot containing the interleaved data from two speech coder frames, which are 20 milliseconds apart. If the deinterleaver 104 is implemented according to IS-54 protocol, the received data are placed row-wise into a 26×10 deinterleaving array. Once the data from the two time slots are used for the deinterleaving array, all the data for frames X are available and can be decoded. One entire speech coder frame is available after the deinterleaving.

The encoded speech frame is output from the deinterleaver 104 to the channel decoder 106, which performs convolutional decoding and cyclic redundancy check to recover the decoded, digital voice samples. The decoded digital voice sample are then output from the channel decoder 106 to the speech coder 108, which outputs an analog 4 kHz signal in response to the parameters supplied in the 20 millisecond frame of speech in the digital voice sample.

As described below, the gateway interface 74 packetizes the digital speech samples as represented by the output of the speech coder 120. Hence, all error correction codes and processing by the channel coder 118 and the interleaver 116 are "stripped off" to recover the "raw" digital data generated by the speech coder 120. As will be appreciated by those skilled in the art, such error correction is not necessary during transport via the packet switched network 72 because the corresponding transport protocol, for example TCP/IP, provides its own protocol to minimize loss of data. Hence, the "stripping off" of the error correction codes to recover the original digital voice samples as output by the speech coder 120 maximizes the throughput of the packet switched network without affecting the bit error rate during transmission.

Figure 4:
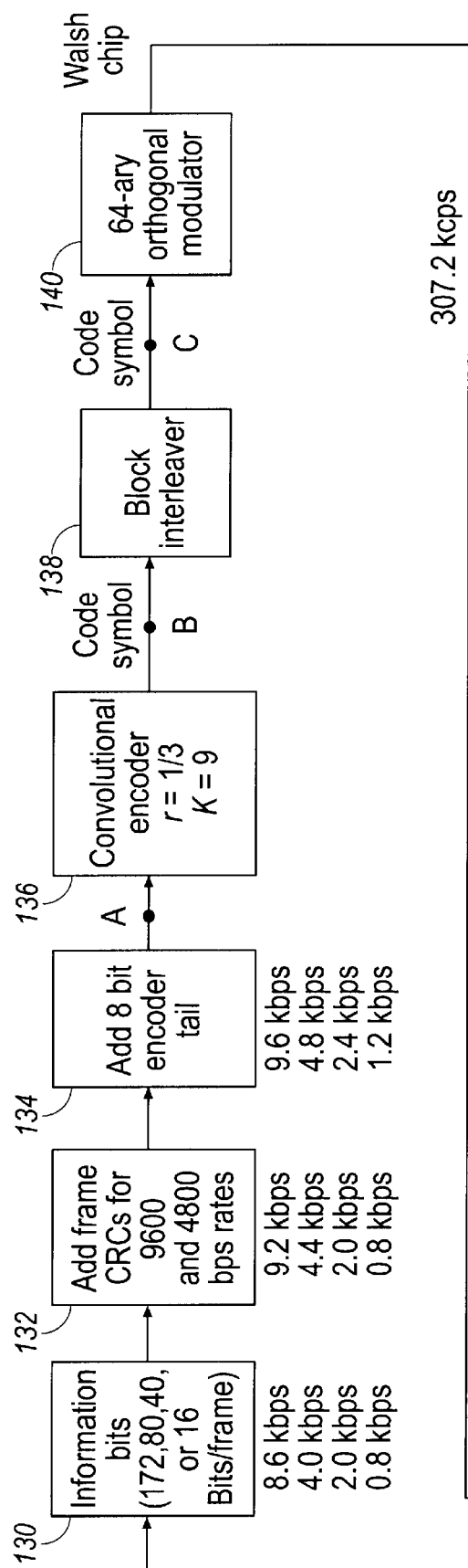
FIG. 4 is a block diagram of a digital telephone operating according to code division multiple access (CDMA) channel modulation on a reverse channel.
Figure 4:
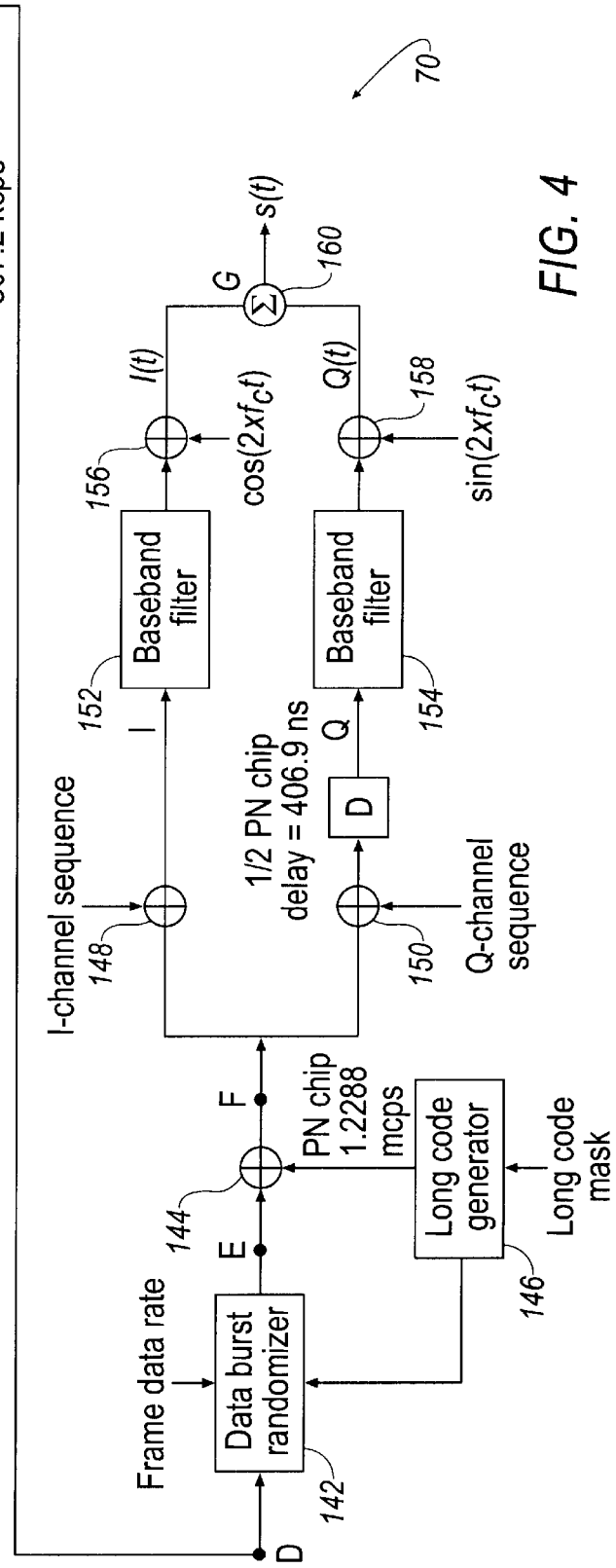

FIG. 4 is a block diagram illustrating a transmitting portion of a variable rate digital telephone 70 implemented using CDMA modulation techniques. The transmitted signal output by the digital telephone 70, also referred to as the reverse CDMA channel, begins with generation of an analog speech signal by a microphone (not shown). The analog speech signal is digitized by a speech coder 130 that outputs digital voice samples at a selected number of bits per frame depending on the resolution of the speech coder 130 and the voice activity. As shown in FIG. 4, the speech coder 130 may output digital voice samples at varying output rates, for example 8.6 kbps, 4.0 kbps, 2.0 kbps or 0.8 kbps. The digital voice samples are output to a CRC encoder 132, which adds CRC codes for voice frames having 8.6 kbps or 4.0 kbps frame rates. The CRC encoder outputs the CRC-encoded frames to a second encoder 134, which adds an 8 bit encoder tail. The encoder 134 outputs the encoded signal to a convolutional encoder 136, which performs convolutional encoding on the encoded, digital voice samples. After encoding by the convolutional encoder 136, the code symbols are output to a block interleaver 138, which interleaves the data to minimize loss of data during fading.

The block interleaver 138 forms an array with 32 rows in 18 columns. At 9600 bps, the transmission sequence is to send row by row in a sequence order up to row 32. The interleaved encoded digital voice samples are then output to a modulator 140.

The modulator 140 performs 64-ary orthogonal modulation, with an actual burst transmission rate fixed at 28,800 code symbols per second. This results in a fixed Walsh chip rate of 307.2 thousand chips per second (kcps). Each Walsh chip is spread by four PN chips. The rate of the spreading PN sequence is fixed at 1.2288 million chips per second (Mcps). Hence, the modulator 140 uses 64-ary Walsh codes consisting of 64 codes each 64 bits long and orthogonal to each other. Each 20 millisecond reverse traffic channel frame is divided into 16 equal length (i.e., 1.25 millisecond) power control groups. The data is then direct-sequence spread to a rate of 307.2 kcps. The signal is then supplied to a data burst randomizer 142, which generates a masking pattern of zeros and ones that randomly mask out the redundant data generated by the code repetition in the modulator 140. The signal is then direct-sequence spread by a spreader 144 that receives a spreading code, also referred to as a long code, from a long code generator 146. The spreader 144 performs modulo-2 addition to generate a spread sequence modulated signal having a PN chip rate of 1.2288 Mcps. The spread sequences are then quadrature modulated by spreaders 148 and 150 that generate channel I and Q pilot PN sequences, respectively.

After passing through baseband filters 152 and 154, the I and Q sequences are modulated by modulators 156 and 158, at which point the QPSK spread signals are combined by a combiner 160, and transmitted for reception by a CDMA base station.

As described below, the modulated wireless signal output by the CDMA digital telephone is received at a base station, and the modulated wireless signal is demodulated by despreading the signal with the appropriate codes to recover the encoded digital voice samples. After the error correction codes are stripped off, the decoded digital voice samples corresponding to the output of the speech coder 130 are packetized for transmission via the packet switched network.

Figure 5:
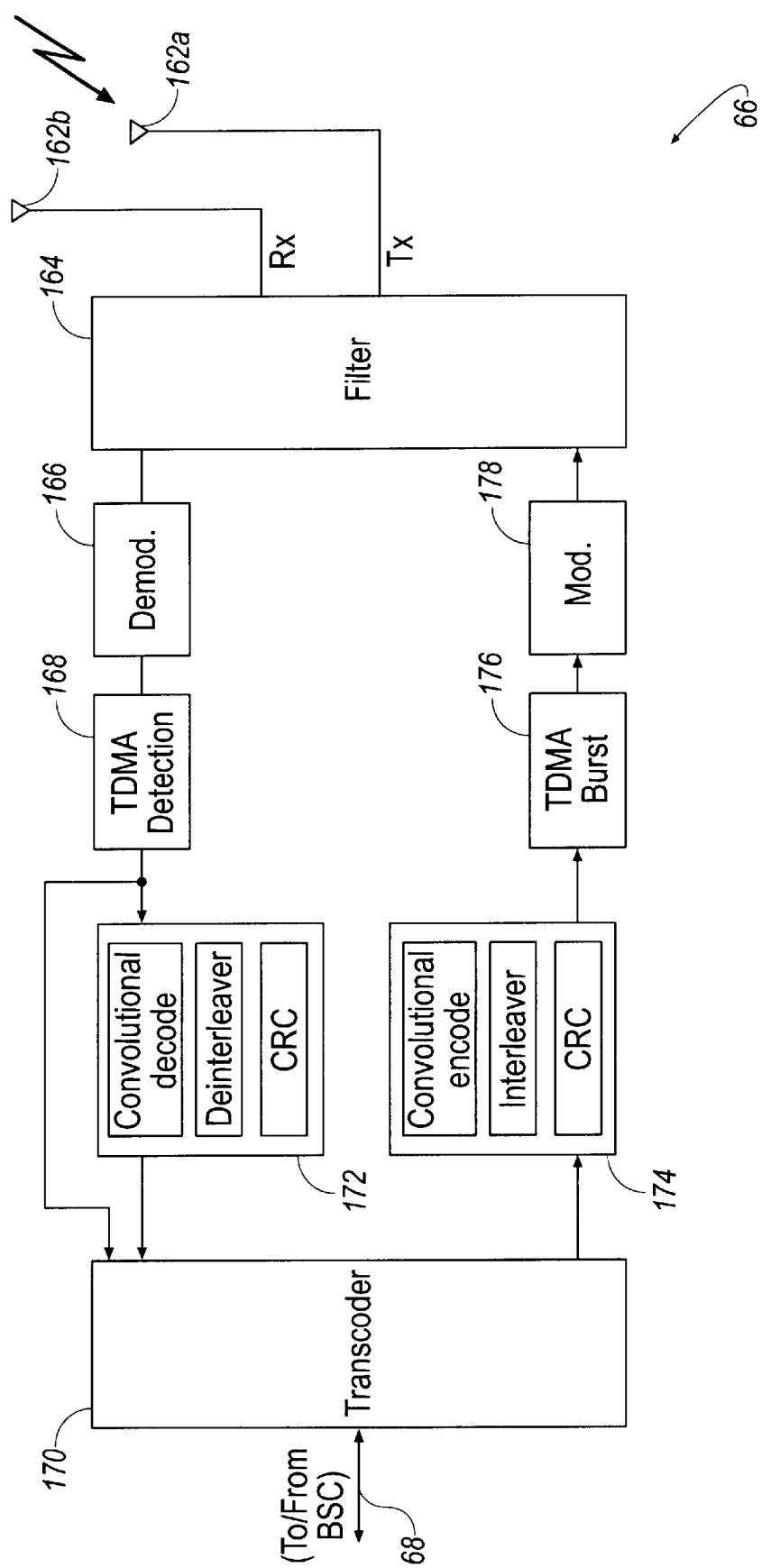
FIG. 5 is a block diagram illustrating a TDMA base station.

FIG. 5 is a block diagram of a base station 66 implemented according to TDMA protocol. The base station 66 shown on FIG. 5 sends and receives modulated wireless signals carrying encoded digital voice samples via antennas 162a and 162b, respectively. After passing through a bandpass filter 164, a received wireless signal is supplied to a demodulator 166, which performs demodulation to recover the TDMA frames. The TDMA frames are then output to a TDMA detector 168, which strips off the TDMA transmission overhead and outputs the encoded digital voice samples that include the error correction associated with convolutional encoding, interleaving, and CRC encoding. According to the disclosed embodiment, the encoded digital voice samples may be decoded directly at the base station site 66, or may be forwarded to the MSC 62 via the BSC 64. In the event that decoding is to be performed at the MSC 62, the encoded digital voice samples are supplied directly to a transcoder 170, which transmits the encoded digital voice samples on a transmission line, for example a T1 transmission line 68. Alternately, the encoded, digital voice samples may be decoded within the BTS 66 using the decoder 172, which performs the interleaving, convolutional decoding, and cyclic redundancy check to generated decoded digital voice samples corresponding to the original digital voice samples generated by the speech coder 120. The decoded digital voice samples output from the decoder 172 are then supplied to the transcoder 170 and forwarded for routing by the MSC 62. The links between the BTS 66 and the BSC 64 follow conventional signaling protocols, such as LAPD link access protocol adapted from ISDN D channel. Link protocol between the BSC 64 and the MSC 62 may be implemented as SS7 protocol.

The base station 66 also performs the necessary encoding for transmission of TDMA modulated signals to digital telephones via the antenna 162a. Encoding is performed by the encoder 174, which includes convolutional encoding, interleaving, and cyclic redundancy check. The encoded digital voice samples are then supplied to a TDMA burst system 176, which formulates the TDMA frames for transmission. The TDMA frames are then modulated by the modulator 178, and the modulated wireless signal is then output by the transmitting antenna 162a.

Figure 6A:
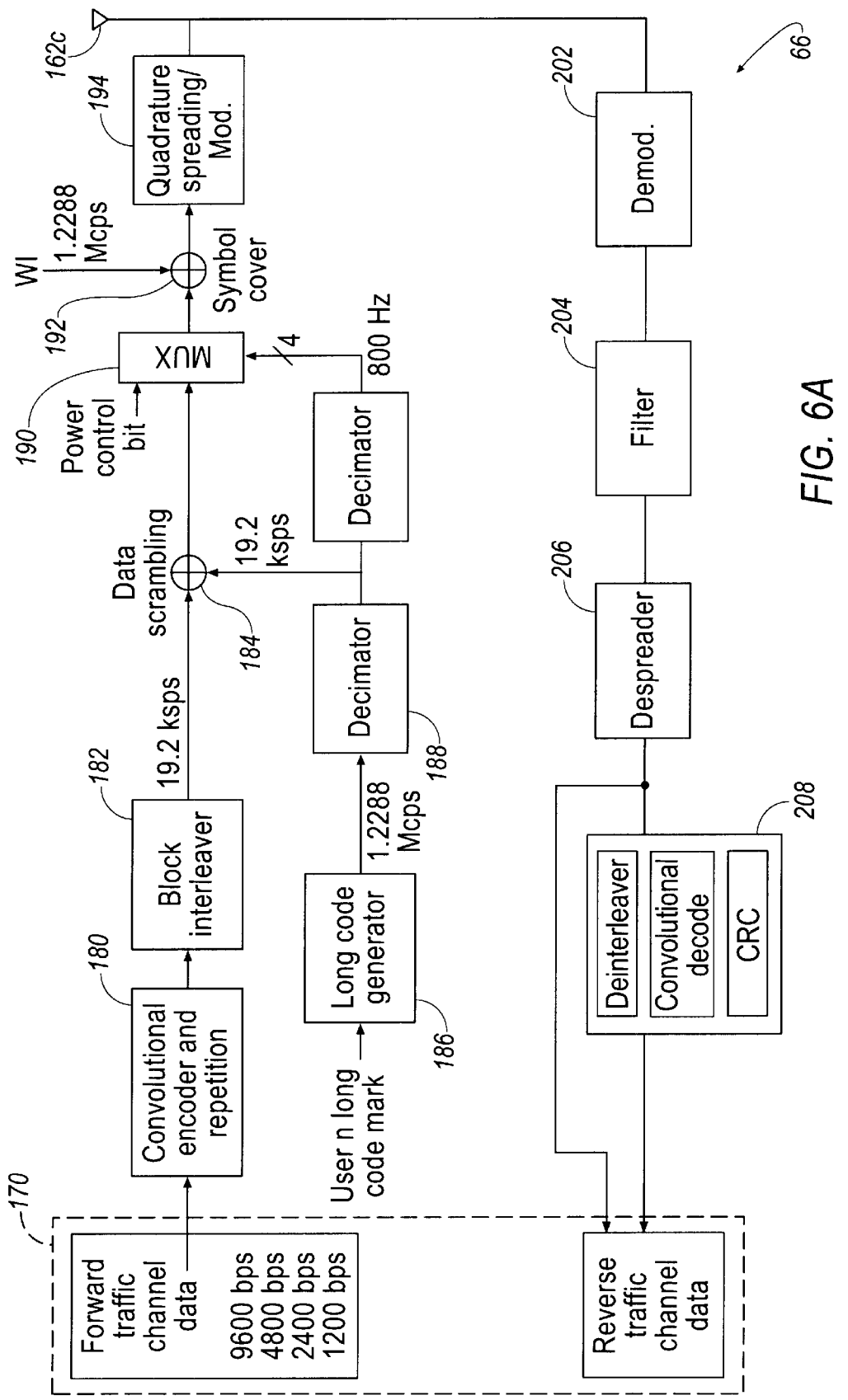
FIGS. 6A and 6B are block diagrams summarizing a CDMA base station.
Figure 6B:
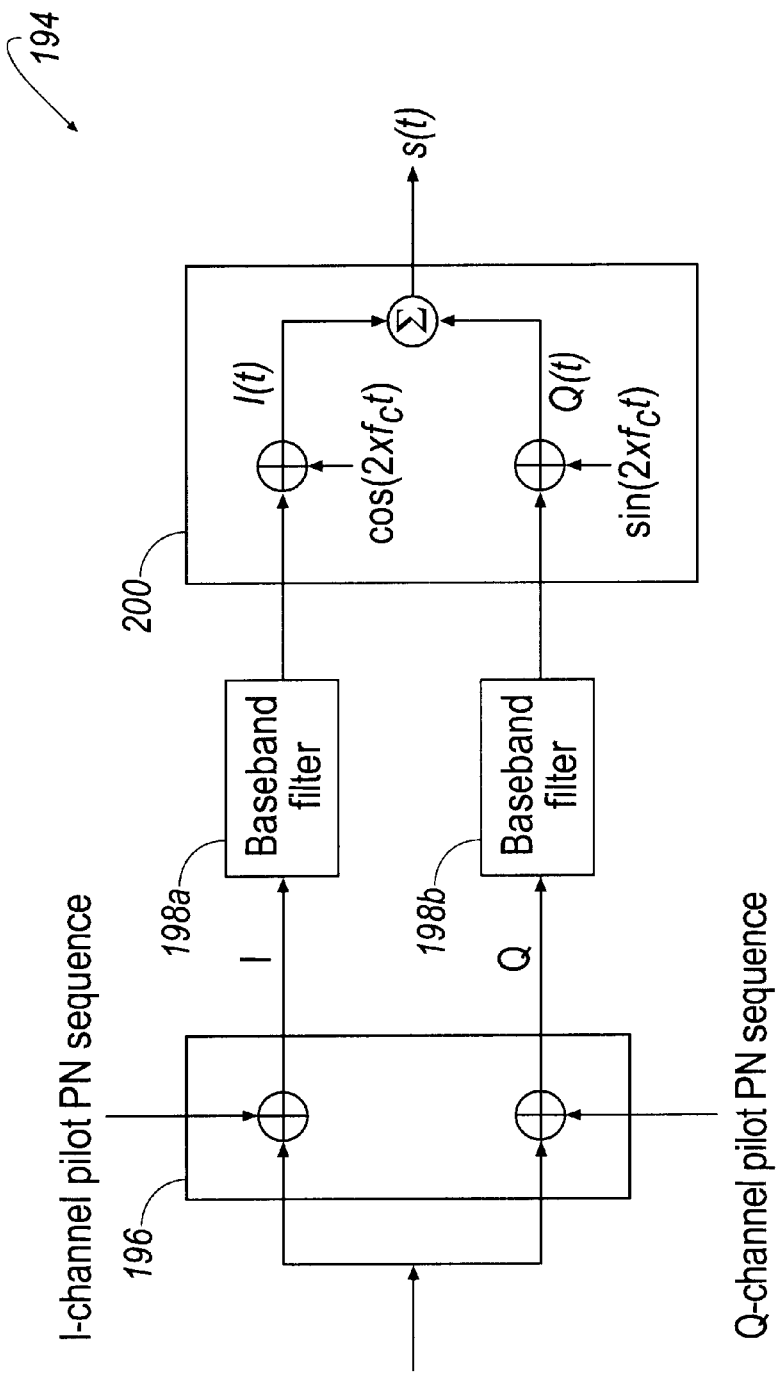

FIGS. 6A and 6B are block diagrams summarizing the operation of a base station 66 operating according to CDMA techniques. Forward traffic channel data to be transmitted by the base station 66 to digital telephones 70 is received by a transcoder 170 that receives digital voice samples from base station controller 64. The digital voice samples may be generated from another digital telephone 70, or a telephone call from the public switched telephone network 84 that has been converted by the MSC into a stream of digital voice samples by using a vocoder in the MSC 62, described below. The digital voice samples are encoded by a convolutional encoder 180 as described above, and the encoded digital voice samples are interleaved by a block interleaver 182. The interleaver 182 outputs the encoded digital voice samples as a data stream having a data rate of 19.2 ksps. The digital data stream output by the block interleaver 182 is then scrambled by a spreader 184, which performs modulo 2 addition on the data stream using a spreading sequence generated by a long code generator 186 and a decimator 188. The spreader 184 outputs a spread spectrum signal having a data rate of 19.2 kilosymbols per second to a multiplexer 190, which adds a power control bit. The spread spectrum signal is then output to a second spreader 192, which performs Walsh covering using a Walsh symbol corresponding to a selected traffic channel at a rate of 1.2288 Mcps. After Walsh covering, the signal is supplied to the modulator 194, which performs quadrature spreading and modulation to generate a spread spectrum modulated wireless signal output by the antenna 162c.

FIG. 6B illustrates in more detail the modulator 194, where the Walsh-covered signal undergoes quadrature spreading by the spreader 196. The spreader 196 outputs quadrature I and Q signals to baseband filters 190a and 190b, respectively. The I and Q signals are then output to the modulator 200, which performs modulation to generate the spread spectrum modulated wireless signal on the forward traffic channel.

As shown in FIG. 6A, the base station 66 includes a receiver portion for the reverse traffic channel, including a demodulator 202, a filter 204, a despreader 206, and a decoder 208. The demodulator demodulates the received modulated wireless signal to recover the I and Q component of the spread spectrum signal. After passing through a baseband filter 204, the I and Q components are despread in the despreader 206 using a specific despreading code to recover each of the spread spectrum modulated encoded, digital voice samples. The despreader 206 outputs each of the encoded, digital voice samples for the corresponding digital telephone 70 to a decoder 208 which performs the decoding to recover the original digital voice sample generated by the corresponding speech coder. Alternately, the encoded digital voice samples may be supplied directly to the transcoder 170 to forward the encoded digital voice samples to the MSC 62.

Figure 7:
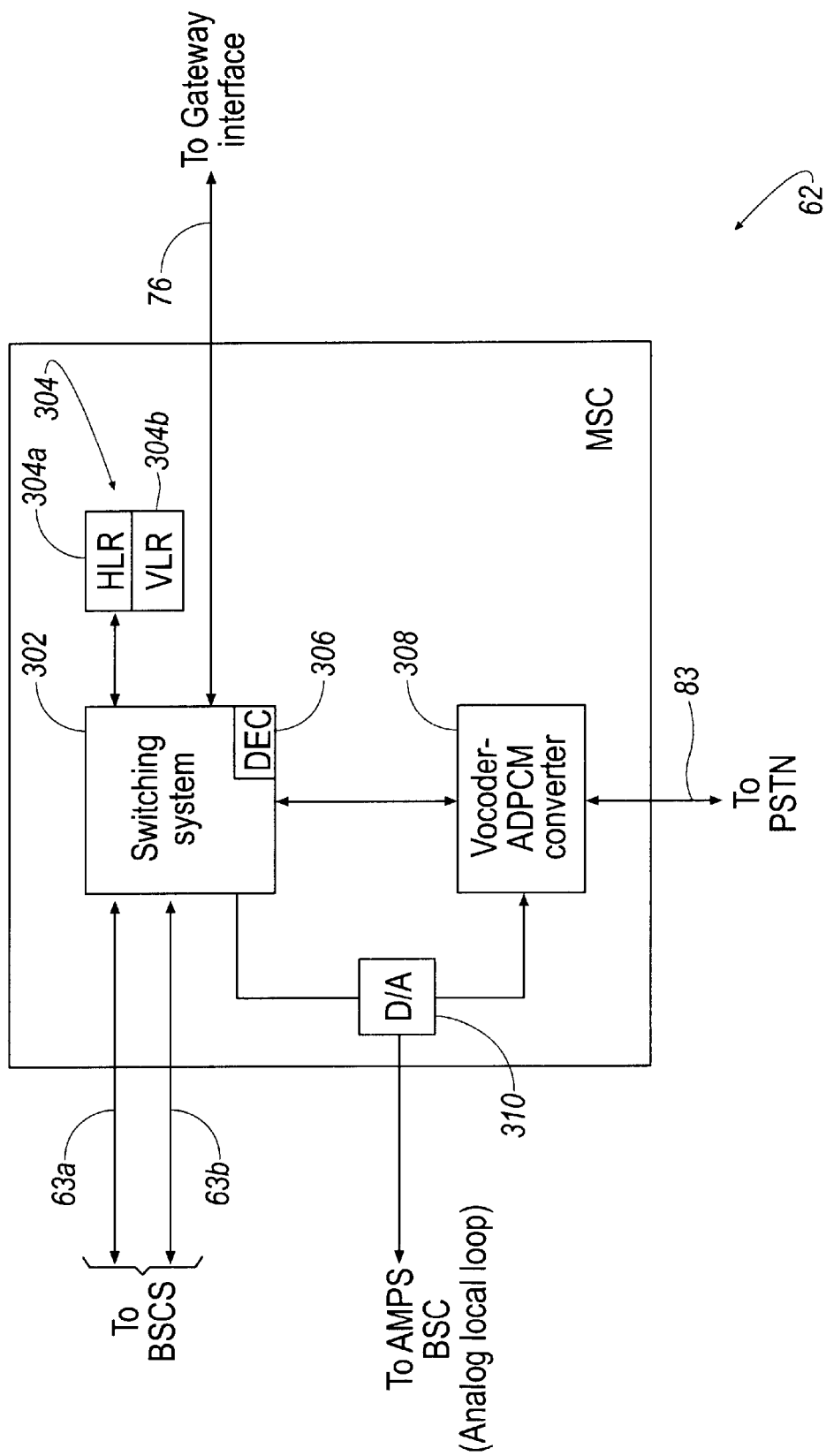
FIG. 7 is a block diagram of one of the mobile switching centers of FIG. 2.

FIG. 7 is a block diagram of the mobile switching center 62 of FIG. 2. The mobile switching center (MSC) 62 performs all routing and call management of voice traffic within the corresponding wireless communication system. Hence, the mobile switching center determines whether voice traffic data received from a digital telephone 70 should be routed to another base station controller 64 within the digital wireless communication system, or to a destination station outside the wireless digital communication system.

The MSC 62 includes a switching system 302 and a subscriber location register 304, including a home location register 304a and a visitor location register (VLR) 304b. Upon receiving voice traffic along communication line 63a from a digital telephone 70, the switching system 302 checks the destination telephone number corresponding to the received voice traffic to determine if the destination telephone number is identified in the subscriber location register 304. As recognized in the art, the switching system 302 may access the subscriber location register using different signaling protocols, such as SS7. The subscriber location register 304 stores the actual subscribers to the wireless communication system in the home location register 304a, and visiting (or roaming) subscribers in the visitor location register 304b. If the destination telephone number is not identified in the subscriber location register 304, the destination telephone number is not part of the wireless digital communication system. Hence, a call must be initiated outside the wireless digital communication system to complete the call.

As recognized in the prior art, such calls outside the wireless digital communication system conventionally require land line connection to a public switched telephone network 84, as shown in FIG. 2. Hence, additional land line charges for use of the connection via the PSTN 84 would be incurred by the calling party using the digital telephone 70. Alternatively, if the destination telephone number is part of a nearby competing wireless digital communication system, the first wireless communications system 60a may have an arrangement with the second communication system 60b to transfer communication traffic using a wireless backbone network, for example using microwave communication links (not shown).

According to the present invention, the MSC 62 is able to bypass the public switched telephone network, without the necessity of developing a separate wireless backbone network, by passing the voice traffic through a packet switched network, such as the Internet 72. According to the present invention, the mobile switching center receives the voice traffic from the digital telephone, strips off all unnecessary overhead associated with propagation through the common air interface, and outputs onto a communication path 76 the digital voice samples generated by the speech coder in the digital telephone 70, without any additional error correction or overhead. Hence, all the error correction overhead associated with transmission over the common air interface is removed by decoding the encoded digital voice samples, and outputting the decoded digital voice samples to a gateway interface 70 for transmission on the packet switched network 72.

According to the disclosed embodiment of FIG. 7, the switching system 302 receives via communication lines 63 the decoded, digital voice sample from the base station 66 which has performed the necessary decoding. The switching system 302 also may include a decoding system 306 that performs decoding of any received encoded digital voice samples using the decoding techniques used by the decoders 172 and 208 of FIGS. 5 and 6A, respectively. The MSC 62 also includes a transcoder 308 that converts the digital voice samples into an appropriate format for transmission to the PSTN 84, for example a vocoder-to-ADPCM converter. If desired, the digital voice samples received by the switching system 302 from the communication transmission line 63a may also be passed to a digital to analog converter 210, which generates analog speech signals from the digital voice sample, and hence is equivalent to the speech coder 108 of FIG. 3.

Figure 8A:
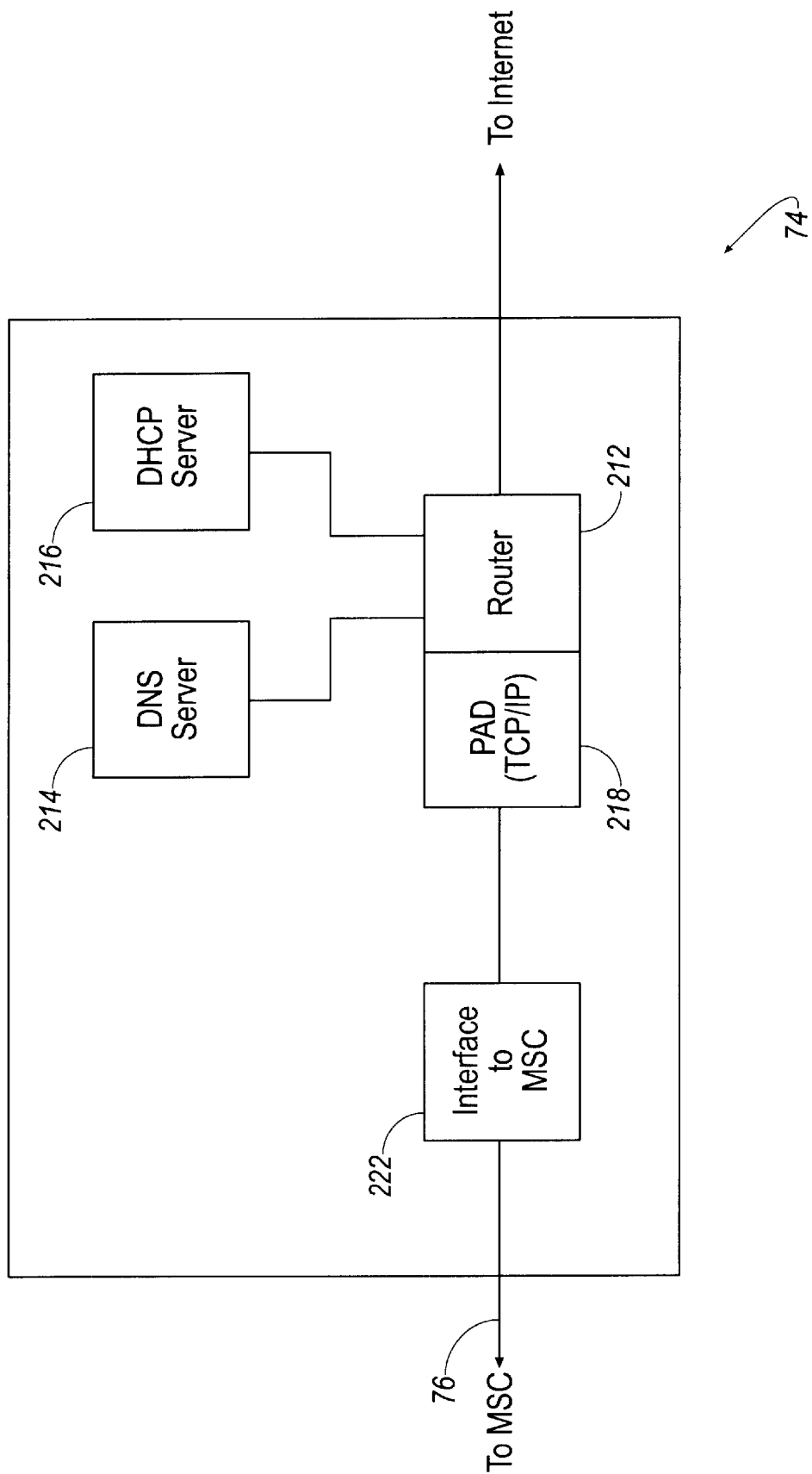
FIGS. 8A and 8B are block diagrams of first and second embodiments of the gateway interfaces of FIG. 2, respectively.
Figure 8B:
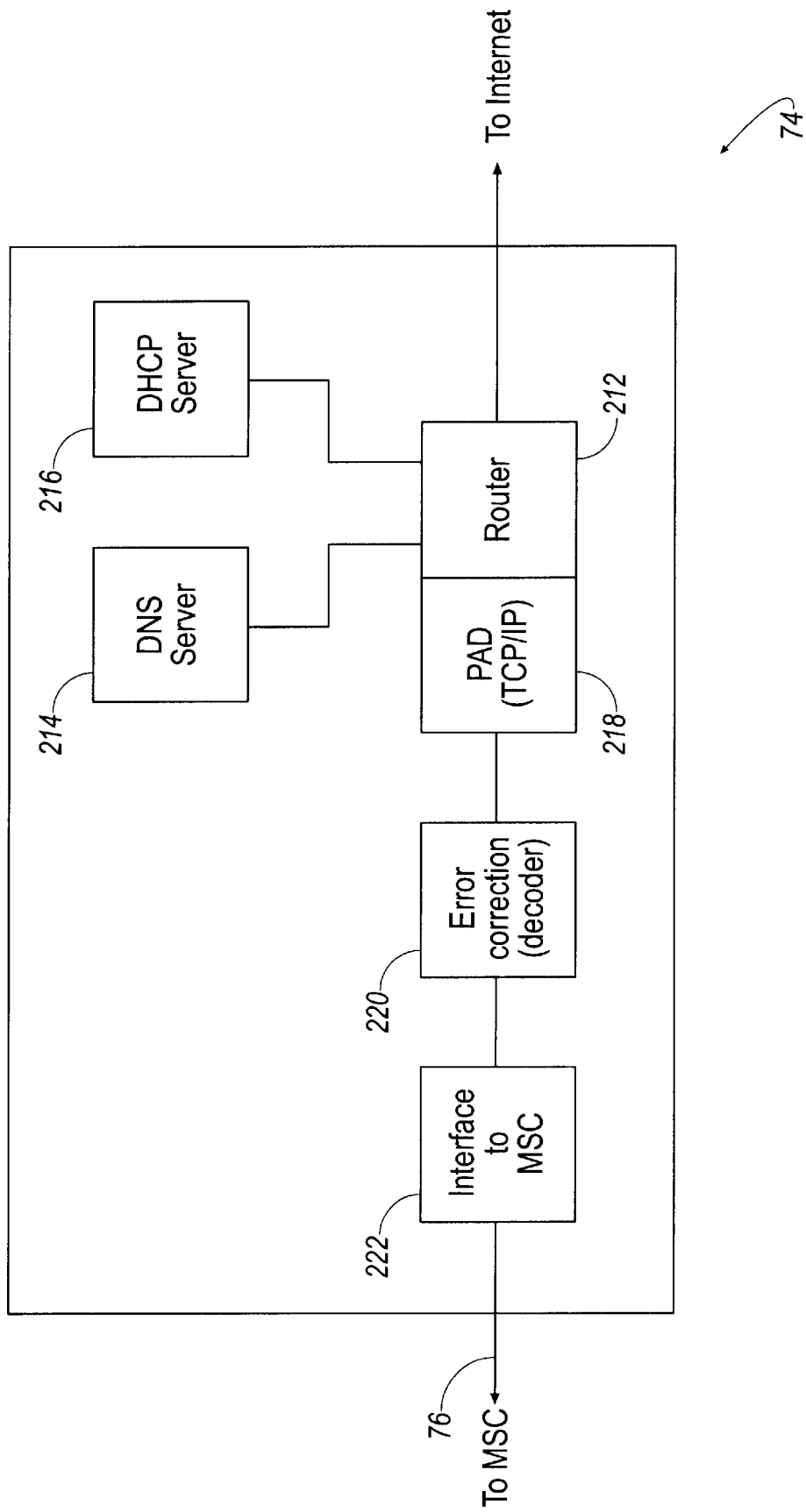

FIGS. 8A and 8B are block diagrams of the gateway interface 74 of FIG. 2 according to first and second embodiments of the present invention, respectively. The gateway interface 74 may be adapted to send and receive data packets between the packet switched network 72 and a communication system, for example the wireless digital communication system 60, or the central office 76. The gateway interface 74 is connected to either the mobile switching center 76 or a transcoder 78 serving a central office via a T1 trunk 76. Alternately, the gateway interface 74 may be integrated as part of the MSC 62 or the central office 76 and the switching systems. The gateway interface 74 may be provided with signalling capabilities, such as SSP capabilities and connected to a CCIS network. Additional details regarding telephone signaling capabilities using the gateway interface 74 are found in commmonly-assigned, copending application Ser. No. 08/698,713, filed Aug. 16, 1996, entitled INTERNET TELEPHONE SERVICE, and Ser. No. 08/670,908, filed Jun. 26, 1996, entitled INTERNET TELEPHONE SERVICE, the disclosures of which are incorporated in their entirety herein by reference.

Figure 1:
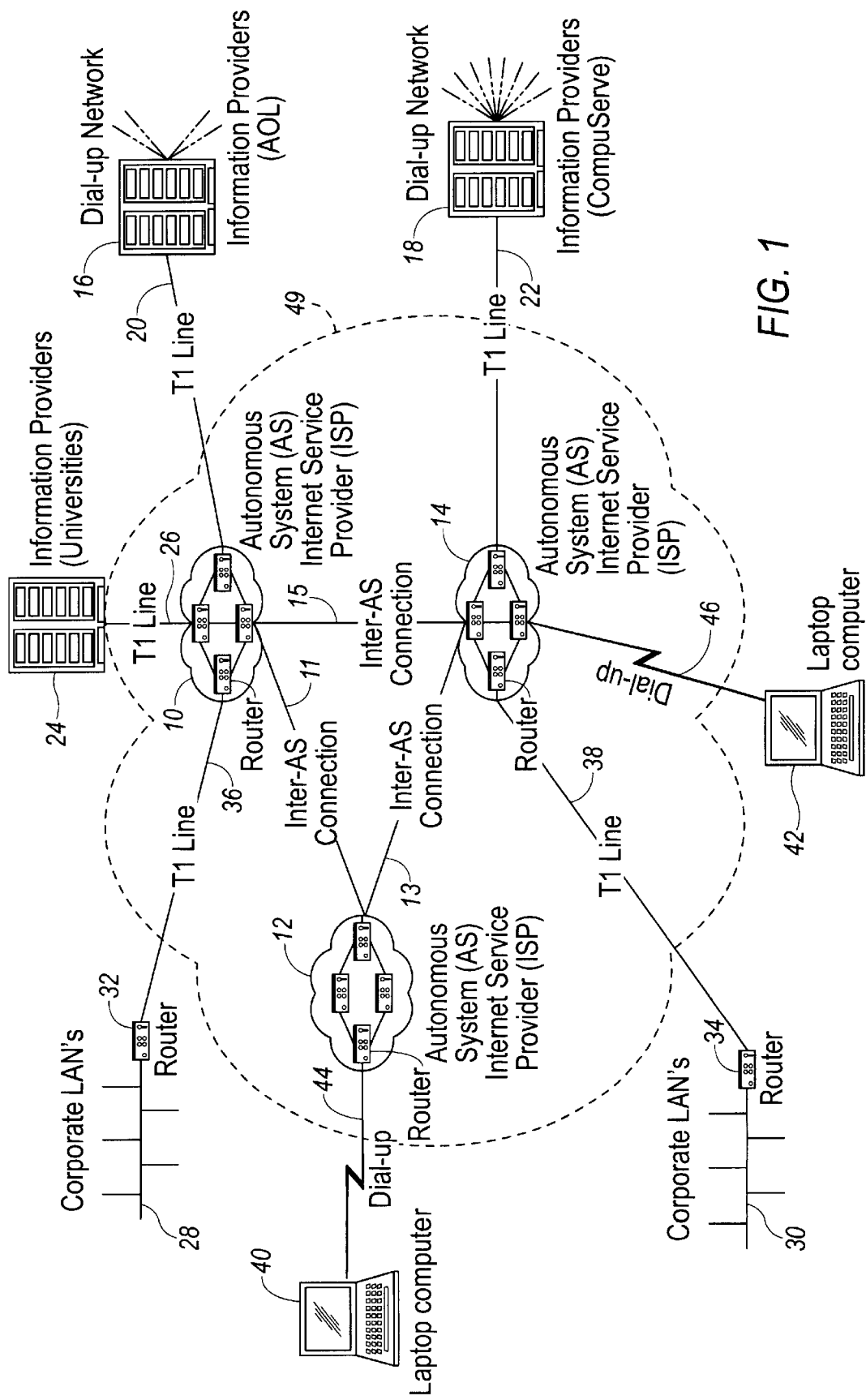
FIG. 1 is a simplified diagram of the Internet.

As shown in FIGS. 8A and 8B, the gateway interface 74 includes a router 212 of the type now generally used in Internet practice, such as shown in FIG. 1. The router 212 is connected to a domain main service (DMS) server 214 and a dynamic host configuration protocol (DHCP) server 216 of the type conventionally used by Internet service providers in existing Internet service. The interface 74 also includes a packet assembler/disassembler (PAD) 218 that packetizes the digital voice samples into data packets having a destination address corresponding to the destination telephone number. The PAD 218 packetizes the digital voice samples by breaking the digital voice samples into segments, and assembling the digital voice sample segments as payload data for the data packets. The PAD 218 then and assigns a destination address to the data packet based on a packet address assigned by the router 212. The router 212 then outputs the assigned data packets onto the Internet 72 for reception by a network node corresponding to the destination address in the packets.

The gateway interface of FIG. 8A sends and receives the decoded digital voice samples to and from the MSC 62 via the transmission line 76. Hence, the interface 74 of FIG. 8A merely performs the packetizing and routing of the decoded digital voice samples. FIG. 8B, however, includes an error correction section 220 that performs deinterleaving, convolutional decoding and CRC decoding functions as performed normally by the decoding systems 172 and 208 of FIGS. 5 and 6A, respectively. Hence, the gateway interface FIG. 8B includes an interface section comprising the transmission interface 222 and the decoding system 220 that decodes encoded digital voice samples received from the MSC 62. Hence, the gateway interface is capable of performing the "stripping" of error correction codes prior to packetizing the digital voice samples.

As shown in FIG. 2, the network node corresponding to the destination address will be identified as one of the gateway interfaces 74 having the appropriate network address. FIGS. 9A, 9B and 9C are alternate implementations of a data packet 250 transporting digital voice samples on the packet switched network 72. As shown in FIG. 9A, the data packet 250 includes a header portion 252 and a payload portion 254 carrying the voice data 256 and the destination telephone number 258. The use of the data packet as shown in FIG. 9A provides the additional advantage that minimal signalling is necessary between the corresponding gateway interfaces, although overhead is reduced by constant transmission of the destination telephone number 258.

An alternative implementation is shown in FIG. 9B, where the data packet stores the same destination IP address in the header 252, but the payload is modified by substituting a session number 260 instead of the telephone number 258. Hence, each telephone call placed via the Internet will involve some initial handshaking between the gateway interfaces to establish a particular session number identifying the telephone call. Hence, the session number 260 identifies the call between two gateway interfaces, as opposed to the destination telephone number. As such, the session number 260 is dynamically allocated by the gateway interfaces during the setup of the telephone call. After an on-hook is detected at the end of a telephone call, a call tear-down procedure will be performed between the two gateway interfaces, after which point the session number can be reused.

FIG. 9C discloses an alternate arrangement, where the entire payload 254 of the data packet is used to transport the voice data packets, and each of the gateway interfaces 74 on each end of the Internet transmission use internal controls to monitor the reception of voice traffic.

A telephone call will now be described with respect to the disclosed embodiment. Assuming that a digital telephone 70a in communication with one of the BTSs 66 of the communication system 60a wishes to place a telephone call to the user of the digital telephone 70b, the user of the digital telephone 70a places a telephone call by entering the digits of the destination telephone number and placing a send key. Signaling communication between the BTS 66 and the MS 70a will typically assign a traffic channel for use by the digital telephone 70a. As recognized by the art, the modulated wireless signal transmitted by the MS 70a will be received by one of the base stations 66 and demodulated to obtain the encoded digital voice samples. As shown in FIGS. 5 and 6A, the encoded digital voice samples may either be decoded at the base station 66, or the encoded digital voice samples may be supplied directly to the MSC 62a via the transmission lines 68 and 63. Assuming that the encoded digital voice samples are supplied to the MSC 62, the MSC 62 receives the encoded digital voice samples and decodes the encoded digital voice samples using the decoding system 306 in FIG. 7. The switching system 302, having already accessed the subscriber location register 304 to determine that a call must be placed outside the digital wireless communication system 60A, outputs the decoded digital voice samples on the transmission path 76 to the gateway interface 74A.

The gateway 74 includes an interface 222 that receives the decoded digital voice samples from the MSC 62a, and passes the decoded digital voice samples to the PAD 218, which packetizes the decoded digital voice samples from the data stream into data packet payload segments. The PAD 218 receives a packet address assigned by the router 212, and assembles the payload data into data packets. The router 212 then outputs the assigned data packets onto the packet switched network 72 for reception by a network node 74b corresponding to the destination address of the data packets. Hence, the router 212 accesses the DNS server 214 and the DHCP server 216 to generate a destination address in response to the destination telephone number of the digital voice samples.

The gateway interface 74b receives the data packets from the packet switched network 72 that have the destination packet address corresponding to the network address of the gateway interface 74b. The gateway interface 74b has the same structure as shown in FIG. 8, and uses the router 212 to receive the data packets having the appropriate destination address. After collecting the data packets from the network 72, the router 212 passes the received data packets to the PAD 218, which assembles the payload data of digital voice sample segments into the frames of digital voice samples. The PAD 218 then outputs the digital voice samples to the interface 222 for transmission to the MSC 62b. After the MSC 62b receives the digital voice samples from the gateway interface 74b, the MSC 62b selectively routes the digital voice samples in response to the destination telephone number identified by the addressing in the data packet received by the router 212. Hence, the addressing information shown in FIGS. 9A, 9B or 9C are used by the router 212 to provide a destination telephone number to the MSC 62b. The MSC 62b routes the digital voice samples to the appropriate BSC 64 for transmission by the BTS 66. The BTS 66, upon receiving the digital sample, encodes the digital samples for RF transmission and modulates the encoded digital samples for transmission as a modulated wireless signal to the mobile station 70b. The mobile station 70b then demodulates and decodes the encoded digital voice samples and then sends the decoded digital voice samples to the speech coder to generate the analog voice signal.

The Internet 72 may also be used to transport voice traffic between an analog telephone 80 and a digital telephone 78 as shown in FIG. 2. For example, the central office 76 may include analog to digital converters 86 and digital to analog converters 82 that convert analog voice signal sent and received to and from the analog telephone 80 into digital voice samples compatible with the speech coder in the digital telephone 70A. In this case, the analog to digital converter 86 will digitize the analog speech signals received by the telephone 80. The central office 76 will output the digitized signals to a transcoder 78 via a transmission line 79, for transmission to the gateway interface 74C. The interface 74c, stripped of all error correction codes and coding performed by the transcoder 78, packetizes the digital voice samples, and assigns a destination address corresponding to the destination telephone number of the mobile station 70a. The gateway interface 74c uses its internal router 212 to establish a destination address for the data packet carrying the digital voice samples. As described earlier, the destination address is generated in response to the destination telephone number. The gateway interface 74c outputs the data packet onto the Internet 72 for reception by the network node 74a having a network address corresponding to the destination address of the data packets. The gateway 74a receives the data packets output by the gateway interface 74c from the Internet 72 based on the destination address of the data packets corresponding to the network address of the gateway interface 74a. After collecting the data packets from the Internet 72, the gateway interface 74a uses the PAD 218 to extract the payload data of the digital voice sample segments. The PAD 218 assembles the digital voice sample segments into the digital samples, and outputs the digital voice samples to the MSC 62a. The MSC 62a selectively routes the digital voice samples received from the gateway interface 74a in response to the destination identified by the data packet. Hence, the MSC routes the digital voice samples to the appropriate BTS 66 for encoding, modulation, and transmission to the mobile station 70a.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. In a wireless digital communications system receiving a modulated wireless signal from a digital telephone, the digital telephone having a subscriber telephone number and a vocoder for compression of voice signals to generate digital vocoder voice samples in a vocoder protocol specifically adapted for the wireless digital communications system, the modulated wireless signal carrying an encoded form of the digital vocoder voice samples as encoded, digital voice samples for a destination telephone number, a system comprising:

a first wireless transceiver having a demodulator demodulating the received modulated wireless signal and outputting a first data stream carrying the encoded, digital voice samples;

a decoder decoding the encoded, digital voice samples and in response outputting said digital vocoder voice samples from the first data stream in said vocoder protocol; and a gateway interface sending and receiving packet data via a packet switched network, the gateway interface having a packet assembler/disassembler receiving said digital vocoder voice samples in the vocoder protocol, the packet assembler/disassembler packetizing the received digital vocoder voice samples into data packets having a destination address corresponding to said destination telephone number, the gateway interface outputting said data packets onto the packet switched network for reception by a network node corresponding to said destination address.

2. The system of claim 1, wherein the packet switched network is Internet, the gateway interface supplying the data packets with an IP address as said destination address and outputting the data packets onto Internet.

3. The system of claim 1, wherein the gateway interface further comprises a router outputting said destination address in response to reception of the destination telephone number.

4. The system of claim 1, further comprising a second gateway interface corresponding to said network node, the second gateway interface recovering and outputting the digital vocoder voice samples from the data packets.

5. The system of claim 4, further comprising a transcoder outputting the recovered digital vocoder voice samples onto tandem trunk telephone lines.

6. The system of claim 5, further comprising a speech coder receiving the recovered digital vocoder voice samples from the tandem trunk lines and outputting analog voice signals onto an analog telephone line.

7. The system of claim 4, further comprising:

a switching controller outputting the recovered digital vocoder voice samples; and a second wireless transceiver transmitting the recovered digital vocoder voice samples from the switching controller as a second modulated wireless signal to a second digital telephone assigned the destination telephone number.

8. The system of claim 7, wherein the second wireless transceiver comprises a modulator modulating the recovered digital vocoder voice samples into one of a time division multiplexed digital signal and a code division multiplexed digital signal.

9. The system of claim 7, further comprising a speech coder outputting analog voice signals to the second wireless transceiver in response to reception of the recovered digital vocoder voice samples from the second switching controller.

10. The system of claim 1, wherein the encoded, digital voice samples are received from the digital telephone in an interleaved sequence, the decoder comprising:

a deinterleaver reordering a frame sequence of the encoded, digital voice samples; and a convolutional decoder decoding the encoded, digital voice samples.

11. The system of claim 10, wherein the decoder further comprises a cyclic redundancy check (CRC) decoder detecting presence of errors in the encoded, digital voice samples.

12. The system of claim 1, wherein the gateway interface has a predetermined network address, the gateway interface receiving second data packets carrying second digital vocoder voice samples and having a destination address corresponding to said predetermined network address from the packet switched network.

13. The system of claim 12, wherein the gateway interface sends and receives the first and second data packets to and from the packet switched network in Internet Protocol.

14. The system of claim 13, wherein the gateway interface sends and receives the first and second data packets according to TCP/IP protocol.

15. The system of claim 14, further comprising a switching controller selectively routing the second digital voice samples, received from the gateway interface, to one of the first wireless transceiver and a public switched telephone network.

16. The system of claim 15, wherein the received second data packets have a payload carrying the second digital vocoder voice samples and a second destination telephone number, the switching controller routing the digital vocoder voice samples in response to the second destination telephone number.

17. The system of claim 15, wherein the received second data packets have a payload carrying second digital vocoder voice samples and a session identifier, the switching controller routing the digital vocoder voice samples in response to the session identifier.

18. The system of claim 15, wherein the destination address identifies a second destination telephone number, the switching controller routing the digital vocoder voice samples in response to the destination address.

19. The system of claim 1, wherein the first transceiver is a time division multiple access transceiver.

20. The system of claim 1, wherein the first transceiver is a code division multiple access transceiver.

21. A wireless digital communications system providing wireless voice communications with a digital telephone transmitting a first modulated wireless signal carrying first vocoder voice samples of compressed digitized voice signals in a vocoder protocol specifically adapted for the wireless digital communications system, the wireless digital communications system comprising:

at least one wireless transceiver receiving the first modulated wireless signal and in response outputting a data stream carrying said first vocoder voice samples in the vocoder protocol;

an interface coupled to the wireless transceiver for receiving said first vocoder voice samples in the vocoder protocol, the interface packetizing the received first vocoder voice samples from the data stream into first data packets, the interface also assembling second vocoder voice samples compressed and digitized in the vocoder protocol from second data packets and encoding the assembled second vocoder voice samples for transmission to the digital telephone via the transceiver; and a router outputting the first data packets onto a packet switched network for reception by a destination telephone station and for receiving from the packet switched network said second data packets carrying said second vocoder voice samples representing voice signals from said destination telephone station in compressed digitized form in the vocoder protocol.

22. The system of claim 21, wherein encoded, first vocoder voice samples are received from the digital telephone in an interleaved sequence, the interface comprising:

a deinterleaver reordering a frame sequence of the encoded, first vocoder voice samples; and a convolutional decoder decoding the encoded, first vocoder voice samples.

23. The system of claim 22, wherein the interface further comprises a packet assembler/disassembler assembling and disassembling the second vocoder voice samples and the decoded vocoder voice samples, respectively.

24. A method, comprising:

digitizing and compressing speech signals to form vocoder speech samples in a specific vocoder protocol adapted for wireless speech communication by a wireless communications network;

transporting the vocoder speech samples to a gateway interface, the vocoder speech samples remaining in said vocoder protocol throughout transport to the gateway interface;

packetizing the vocoder speech samples in said vocoder protocol within packets of an internetwork protocol;

including in each of the packets an internetwork address corresponding to a destination telephone number; and transmitting the addressed packets containing the vocoder speech samples in said vocoder protocol through a public, packet-switched internetwork.

25. A method as in claim 24, wherein the step of transporting comprises:

encoding and modulating the vocoder speech samples;

sending the encoded and modulated vocoder speech samples over an air-link;

receiving signals from the air link;

demodulating and decoding the received signals to recover the vocoder speech samples in said vocoder protocol; and transporting the recovered vocoder speech samples to the gateway interface.

26. A method as in claim 24, wherein the public, packet-switched internetwork comprises the Internet.

27. A method as in claim 24, further comprising:

receiving the addressed packets containing the vocoder speech samples in said vocoder protocol through the public, packet-switched internetwork;

recovering the vocoder speech samples in said vocoder protocol; and communicating speech information of the samples through a telephone network to a destination station associated with the destination telephone number.

28. A method as in claim 27, wherein the step of communicating speech information comprises:

transporting the vocoder speech samples in said vocoder protocol recovered from the packets to another wireless communication network; and sending the vocoder speech samples in said vocoder protocol recovered from the packets through said another wireless communication network to a wireless station associated with the destination telephone number.

29. A method as in claim 27, wherein the step of communicating speech information comprises:

converting the vocoder speech samples recovered from the packets from said vocoder protocol to speech signals in a protocol compatible with transport through a public switched telephone network; and sending the speech signals through the public switched telephone network.

30. A method as in claim 24, wherein the vocoder speech samples in a protocol comprise digital samples digitized and compressed with a coding algorithm conforming to requirements of the wireless communications network.

31. A method as in claim 30, wherein the coding algorithm comprises an algorithm selected from the group consisting of: Regular Pulse Excitation (RPE) coding, Linear Predictive Coding (LPC), excited linear predictive (CELP) coding and vector-sum excited linear predictive (VSELP) coding.

* * * * *